April 11, 1967 N. O. ROSAEN 3,313,418
BAYONET FILTER ASSEMBLY
Filed June 24, 1966 2 Sheets-Sheet 1
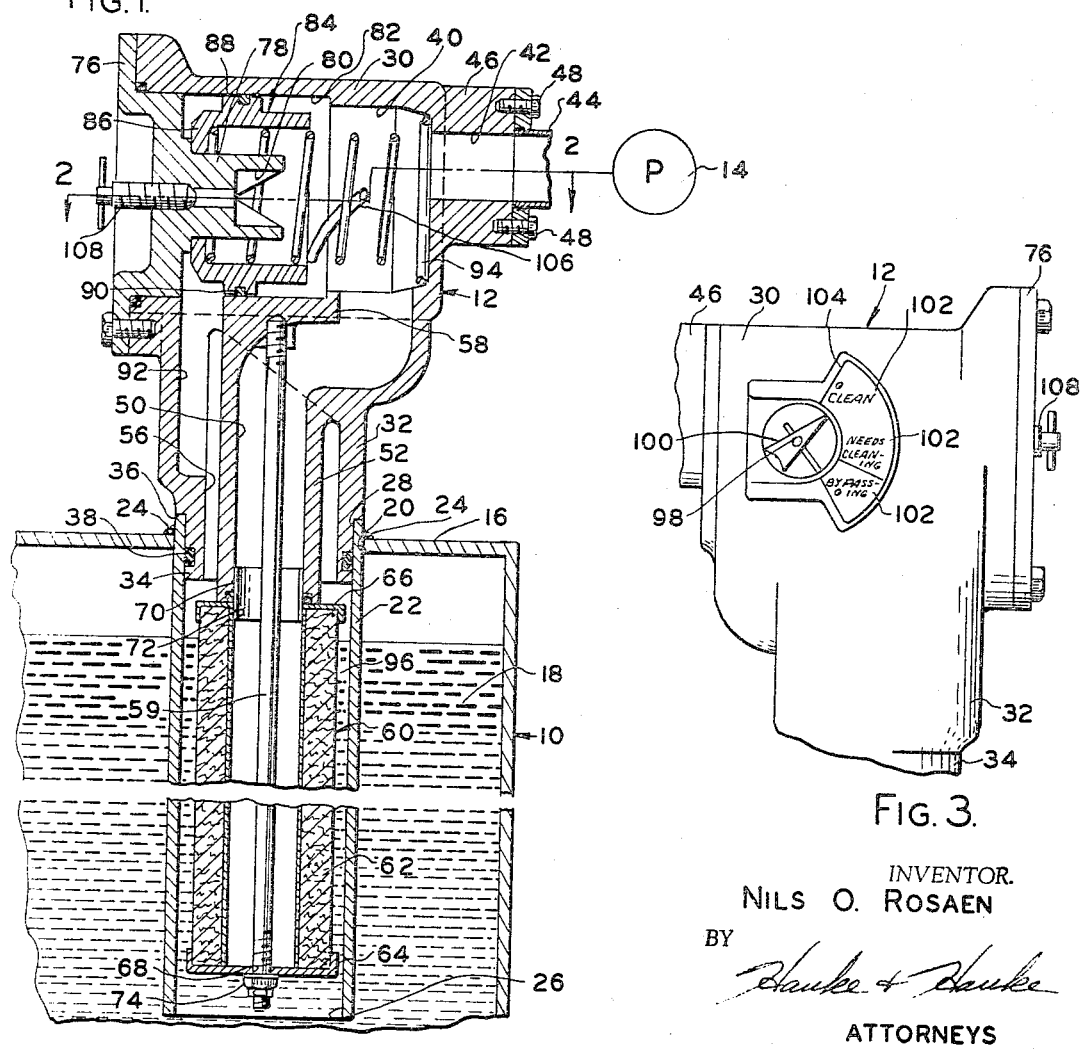
INVENTOR.
NILS O. ROSAEN
BY
Hauke & Hauke
ATTORNEYS INVENTOR
NILS O. ROSAEN
BY Hauke, Kies, & Gifford
ATTORNEYS

United States Patent Office 3,313,418
Patented Apr. 11, 1967

3,313,418
BAYONET FILTER ASSEMBLY
Nils O. Rosaen, Bloomfield Hills, Mich., assignor to The Rosaen Filter Company, Hazel Park, Mich., a corporation of Michigan
Filed June 24, 1966, Ser. No. 563,625
10 Claims. (Cl. 210—90)

This is a continuation-in-part of my copending applications Ser. Nos. 313,524 and 313,627 both filed Oct. 3, 1963 and now abandoned.

The present invention relates to fluid systems, particularly to a filter device for such systems and more particularly to a filter device adapted to be readily inserted into and removed from the reservoir for such systems and having means located exteriorly of the reservoir to indicate the condition of the filter element.

A co-pending application Ser. No. 562,417 having a filing date of June 8, 1966, discloses a certain new mobile filter device which is adapted to be inserted into the reservoir of fluid systems. This new filter device has a particular advantage that much of the housing structure heretofore necessary is eliminated. This produces a substantial reduction in manufacturing costs for such devices. Further, the filter devices are readily accessible for removal of the filter element for cleaning and replacement and means are provided for bypassing the filter element when it reaches a predetermined clogged condition. Indicating means are provided exteriorly of the device for indicating the condition of the filter element.

Although these new filter devices have proven to be quite satisfactory, further experimentation and development has produced the filter device of the present disclosure. In my aforementioned mobile filter devices, axial movement of the filter element is produced by the changes in the pressure differential across the element as it becomes clogged. It is this movement which is used to operate the bypass mechanism as well as the indicating means. Because the filter element must be axially slidably mounted in the device and biasing means must be provided to resist axial movement of the element, to remove the element for replacing or cleaning requires a number of other elements to be removed or be left free to become lost. The filter device of the present invention overcomes this difficulty by utilizing movable elements for operating the bypass means and the indicator means which are separate from and are not connected to the filter element. The filter element is maintained in a fixed position and may be removed for cleaning or replacement without interfering with or disturbing the other elements of the device.

It is an object then of the present invention to improve mobile filter devices of the type disclosed and claimed in my aforementioned co-pending application by providing a fixed filter element for such devices and pressure responsive means supported independently of the filter element for operating the bypass and indicating means.

It is another object of the present invention to facilitate the removal of the filter element of filter devices having pressure responsive means for opening a bypass upon the filter element becoming clogged by providing such responsive means remote and independent of the filter element.

It is another object of the present invention to improve mobile filter devices of the type disclosed and claimed in my aforementioned co-pending application by providing a filter device having a filter element which can be removed without disturbing other parts of the device and which requires a minimum of machining during manufacture.

It is another object of the present invention to reduce the manufacturing costs of mobile filter devices having readily removable filter elements and pressure responsive bypass valving means carried separately from the filter element by providing a ported baffle member disposed in axial alignment with the filter element and communicating with the interior thereof and an axially slidable valve member encompassing the baffle member and operable to open a fluid path through said baffle member and by-passing said filter element upon the pressure differential across said filter element increasing to a predetermined value.

Still further objects and advantages of the present invention will readily occur to one skilled in the art to which the invention pertains upon reference to the following drawings in which like reference characters refer to like parts throughout the several views and in which FIG. 1 is a fragmentary view of one preferred system of the present invention and in which portions of the reservoir and a preferred filter device of the present invention are shown in section for purposes of clarity.

FIG. 2 is a cross-sectional view taken substantially on the line 2—2 of FIG. 1.

FIG. 3 is a fragmentary elevational view of the indicator means of the filter device illustrated in FIG. 1.

Figure 4:
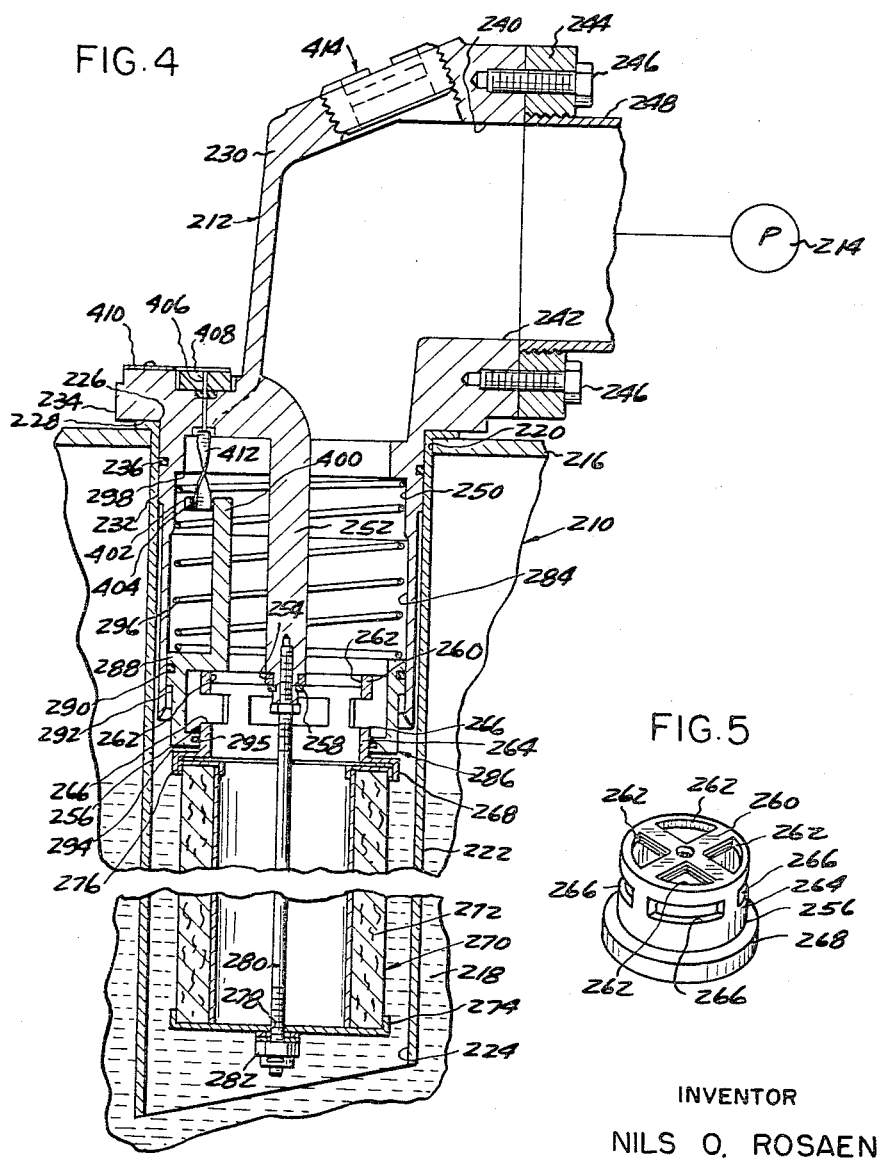
FIG. 4 is a view similar to FIG. 1 but illustrating another preferred embodiment of the present invention.

Now referring to the drawings for a more detailed description of the present invention one preferred fluid system is illustrated in FIGS. 1–3 as comprising a fluid reservoir 10, a filter device 12, and a fluid pump 14.

The fluid reservoir 10 preferably comprises a top plate 16 and is shown as being partially filled with a suitable fluid 18. An opening 20 is provided in the top plate 16.

The filter device 12 preferably includes a tubular housing member 22 which extends axially through the opening 20 as shown. The tubular member 22 is shown as being welded to the plate 16 as at 24 although it is apparent that any other means securing the tubular member 22 to the plate 16 could be used.

The tubular member 22 is preferably positioned such that an open inlet end 26 is disposed below the minimum level of the fluid 18 and an opposite open end 28 is disposed exteriorly of the reservoir 10 and above the top plate 16.

The filter device 12 preferably further comprises a housing structure 30 having an annular portion 32 and which is reduced as at 34 to be received by the exterior open end 28 of the tubular member 22. The shoulder 36 formed by the reduced portion 34 provides seating engagement between the housing structure 30 and the tubular member 22. An O-ring seal 38 is carried by the reduced portion 34 to prevent fluid leakage between the housing structure 30 and the tubular member 22.

The housing structure 30 is provided with an outlet chamber 40 and an outlet 42 communicating therewith. A rigid conduit 44 is preferably secured to a flanged portion 46 defining the outlet 42 by bolts 48 or the like so that the conduit forms the major portion of support for the housing structure 30. The conduit 44 is preferably connected with the fluid pump 14.

The annular portion 32 of the housing structure 30 is provided with a substantially centrally extending passage 50 which communicates with the outlet chamber 40. The passage 50 is defined by an annular wall portion 52 of the housing structure 30 and the wall portion 52 preferably extends into the tubular member 22 somewhat farther than the exterior surface of the annular portion 32, as can best be seen in FIG. 1, a substantialy annular passage 56 is formed in the annular portion 32 encompassing the wall portion 52.

A boss portion 58 protrudes into the upper portion of the passage 50 as shown and provides the means by which an elongated threaded rod member 59 is secured to the housing structure 30, to extend axially through the passage 50 and into the tubular member 22.

A filter assembly 60 preferably comprises one or more cylindrical filter elements 62 sandwiched between spaced flanged members 64 and 66. The flanged member 64 closes the end of the filter element 62 and is provided with a central opening 68 which receives the free end of the threaded rod member 59. The flanged member 66 is adapted to seat against the free end of the wall portion 52 and is provided with an axially extending flange portion 70 adapted to extend into the passage 50 and engage with the interior end of the annular surface of the wall portion 52. The flanged portion 70 defines an opening 72 providing communication between the filter element 62 and the passage 50. It is apparent that tightening the nut 74 on the threaded rod 59 secures the filter assembly 60 to the housing structure 30.

A cap member 76 closes the end of the housing structure 30 opposite the outlet 42 and is provided with a cylindrical boss portion 78 which extends into the outlet chamber 40. The free end of the boss portion 78 is preferably hollow as shown and is provided with a plurality of openings 80.

The housing structure 30 is formed to provide an annular surface 82 encompassing and concentric to the boss portion 78. A valve member 84 is provided with a flanged portion 86 which engages with and is axially slidably carried on the boss portion 78. An axially extending surface 88 of the valve member 84 is provided with a piston ring 90 which engages the surface 82 and prevents fluid leakage between the surface 82 and the valve member 84.

The housing structure 30 is further provided with a chamber 92 which provides communication between the passage 56 and a portion of the surface of the valve member 84. A spring 94 biases the valve member 84 toward the cap member 76.

The filter element 62 is spaced from the interior surface of the tubular member 22 as shown to form a chamber 96. The wall portion 52 positions the filter assembly 60 downwardly somewhat from the housing structure 30 so that communication is provided between the chamber 96 and the passage 56.

It is apparent that fluid is normally pumped by the pump 14 through the inlet 26 of the tubular member 22, through the filter element 62, through the passage 50, into the outlet chamber 40, and out the outlet 42. As the filter element 62 becomes clogged, the pressure differential across the element 62 will increase. The increased pressure differential across the filter element 62 therefore will produce axial movement of the valve member 84 against the force of the spring 94. When the valve 84 moves axially along the boss portion 78 past the openings 80 a fluid path will be opened directly from the chamber 96 to the outlet 42 bypassing the filter element 62.

As can best be seen in FIGS. 2 and 3 a shaft 98 is rotatably carried in the housing structure 30. A pointer element 100 is located on the exterior surface of the housing structure 30 and is secured to the shaft 98 to rotate therewith to point to indicia 102 provided on an indicator plate 104. An arm element 106 is carried on the interior end of the shaft 98 substantially transversely to the axis thereof and engages a portion of the valve member 84 so that axial movement of the valve member 84 produces a corresponding rotational movement of the shaft 98 and the pointer element 100 so that the position of the valve member 84 and therefore the condition of the filter element 62 is indicated exteriorly of the filter device 12.

If it is desired, an aircock 108 may be provided in the cap member 76 to permit exhausting of air which may be accumulated in the outlet chamber 42.

It is apparent that the filter device of the present invention provides a construction including bypassing and indicating means and yet in which the filter element may be readily removed or replaced with a minimum of effort and without disturbing other parts of the device.

When it is desired to remove the filter element 62, the bolts 48 are removed to loosen the connection between the filter device 12 and the conduit 44. The housing structure 30 and the other parts of the filter device 12 secured thereto are lifted from the tubular member 22. The nut 74 is then removed from the rod 59 and the filter assembly 60 can be removed from the rod 59 and the rest of the filter device 12. If it is desired, a plurality of filter elements 62 may be provided for the filter device disclosed in FIGS. 1–3. All that would be necessary would be to replace the rod 59 with another rod of suitable length.

Figure 5:
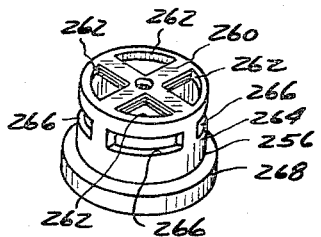
FIG. 5 is a perspective side view of the baffle member of the device illustrated in FIG. 4.

FIGS. 4 and 5 illustrate another preferred embodiment of the present invention as comprising a fluid reservoir 210, a filter device 212, and a fluid pump 214.

The fluid reservoir 210 preferably comprises a top plate 216 and is shown as being partially filled with a suitable fluid 218. An opening 220 is provided in the plate 216.

The filter device 212 preferably includes a tubular housing member 222 which extends axially through the opening 220. The tubular member 222 is provided with an open inlet end 224 and an opposite end 226 provided with a radially extending flange portion 228. The tubular member 222 may be secured to the reservoir 210 by any convenient means such as welding so that the inlet end 224 extends into the reservoir 210 below the minimum level of the fluid 218 of the reservoir 210 and the opposite end 226 is disposed above the reservoir 210 with the flanged portion 228 engaging the plate 216.

The filter device 212 further preferably comprises a housing structure 230 having an annular portion 232 adapted to be received through the end 226 of the tubular member 222. A radially extending shoulder 234 limits axial inward movement of the housing structure 230 and an O-ring seal 236 prevents fluid leakage between the annular portion 232 and the tubular member 222.

The housing structure 230 is provided with an outlet chamber 240 and an outlet 242 communicating therewith. A flanged connector 244 is secured to the housing structure 230 by bolts 246 and provides the means by which a rigid conduit 248 is secured to the housing structure 230 in communication with the outlet 242. The conduit 248 preferably provides the major portion of the support for the housing structure 230 and is connected with the pump 214 as shown.

The annular portion 232 of the housing structure 230 is provided with an axially extending passage 250 which communicates with the outlet chamber 240. A substantially centrally positioned boss portion 252 is integrally formed with the housing structure 230 and extends axially through the passage 250. The free end of the boss portion 252 is preferably reduced as shown at 254 and terminates somewhat above the plane containing the free end of the annular portion 232.

A baffle member 256 is carried on the reduced end 254 of the boss portion 252 preferably by a snap ring 258. The baffle member 256, as can best be seen in FIG. 5, preferably comprises a radially extending medial portion 260, provided with a plurality of annularly spaced openings 262, axially extending portions 264 provided with annularly spaced openings 266, and a flanged end portion 268.

A filter assembly 270 preferably comprises one or more cylindrical filter elements 272 sandwiched between spaced flanged members 274 and 276. The flanged member 274 closes the end of the filter element 272 and is provided with a central opening 278 which receives the free end of a threaded rod 280. The rod 280 is carried by the boss portion 252 and extends axially therefrom into the interior of the tubular member 222. The flanged member 276 seats against the flanged end portion 268 of the baffle member 256 so that tightening a nut 282 on the rod 280 draws the filter assembly 270 tight against the baffle member 256.

The inner wall of the annular portion 232 is preferably machined to provide an annular guide surface 284 concentric with the rod 280 and the baffle member 256. A valve member 286 is provided with a radially projecting portion 288 adapted to axially slidably engage the guide surface 284 and a piston ring 290 is carried on the projecting portion 288 to prevent fluid leakage therepast. The valve member 286 further comprises an axially extending portion 292 concentric to the outer surface of the baffle member 256 and spaced therefrom as shown. The free edge of the portion 292 is provided with a radially inwardly extending portion 294 which slidably engages the outer surface of the baffle member 256. An O-ring seal 295 is preferably carried by the portion 294 to prevent fluid leakage between the outer surface of the baffle member 256 and the portion 294. A spring 296 is biased between a spring seat 298 formed in the housing structure 230 and the projecting portion 288 of the valve member 286 to urge the valve member 286 toward a position in which the portion 294 engages the flanged end portion 268 of the baffle member 256 as shown in FIG. 4.

The valve member 286 is provided with an axially outwardly extending arm member 400. The arm member 400 is provided with a laterally extending portion 402 at the free end thereof and the portion 402 is provided with a rectangular slot 404. A shaft 406 is rotatably carried in the housing structure 230 and a pointer element 408 is secured to the end of the shaft 406 in a position exteriorly of the housing structure 230. The pointer element 408 rotates with the shaft 406 and points to indicia (not shown) provided on an indicator plate 410. An actuator element 412 is carried on the interior end of the shaft 406 in a position substantially co-axial therewith and extends through the slot 404. The actuator element 412 preferably comprises an elongated strip having a substantially uniform twist about its longitudinal axis from end to end. It is apparent then that axial movement of the valve member 286 will cause the arm member 400 to move axially with respect to the actuator element 412 and will engage the sides of the actuator element 412 to produce a rotation of the shaft 406 and the pointer element 408.

A sight tube 414 may be provided in the housing structure 230 to permit inspection of the outlet chamber 240 in the outlet 242.

In operation fluid is normally pumped by the pump 214 through the inlet end 224 of the tubular member 222, through the filter element 272, the openings 262 and 266 provided in the baffle member 256 to the outlet chamber 240 and the outlet 242. As the filter element becomes clogged, the pressure differential across the element 272 will increase. Thus as the filter element 272 becomes clogged, the valve member 286 will be moved axially against the force of the spring 296. This movement produces a corresponding rotational movement of the pointer element 408 so that the condition of the filter element 272 will be indicated exteriorly of the filter device 212.

Before the filter element 272 has become so clogged as to produce the danger of rupturing, the valve member 286 will have moved to a position in which a fluid path is opened directly from the inlet end 226 of the tubular member 222 along the exterior surface of the baffle member 256, through the opening 266 to the interior of the baffle member 256, and through the opening 262 to the outlet 242.

It is apparent that the filter device illustrated in FIGS. 4–5 in addition to the advantages afforded by my aforementioned filter devices, provides a relatively inexpensively manufactured unit. The only machining which must be undertaken with any degree of care is that necessary to provide the guide surface 284 and this surface is positioned adjacent the open end of the housing structure 230 so that it may be easily formed.

Again, the filter device illustrated in FIGS. 4–5 provides an assembly in which any desired number of filter elements 272 may be provided without necessitating a change in either the bypassing or indicating mechansm. The filter elements again may be readily removed for replacement or cleaning without disturbing other members of the device.

Although I have described several embodiments of my invention, it is apparent from the foregoing description that many other changes and modifications can be made therein without departing from the spirit of the invention as expressed by the appended claims.

What I claim is:
1. A filter device comprising,
 (a) a tubular member having an open inlet end and an open opposite end,
 (b) a housing structure including a portion adapted to be inserted in said opposite end of said tubular member,
 (c) a filter element fixed to said housing structure to prevent relative movement therebetween and extending into the interior of said tubular member,
 (d) a cylindrical guide surface formed in said housing structure and a pressure responsive valve means carried by said housing structure and normally directing fluid through said filter element, said valve means having an annular flange portion axially slidably engaging said guide surface and having opposite sides exposed to opposite sides of said filter element whereby said pressure responsive valve means is moved along said guide surface in response to changes in the pressure differential across said filter element, and
 (e) said pressure responsive means being operable to open a fluid path bypassing said filter element upon the pressure differential across said filter element increasing to a predetermined value.

2. The device as defined in claim 1 and including indicator means carrier exteriorly of said housing structure and operably connected with said pressure responsive valve means to indicate the position thereof whereby to indicate the degree of clogging of said filter element.

3. A filter device adapted to be mounted to a fluid reservoir, said filter device comprising:
 (a) a tubular member having an inlet end and an open end opposite said inlet end,
 (b) means positioning said tubular member in said reservoir with said inlet end disposed below the level of fluid in said reservoir and said opposite end disposed exteriorly of said reservoir,
 (c) a housing structure including a portion inserted in said opposite end of said tubular member,
 (d) a filter assembly carried by said housing structure and positioned intermediate said inlet end and said opposite end of said tubular member and including a filter element mounted to said housing structure,
 (e) said filter device including an outlet provided in said housing structure and means normally directing fluid from said inlet end through said filter element and to said outlet, and
 (f) said last mentioned means including an annular guide surface formed in said housing structure, a pressure responsive member carried in said housing structure and operable to move along said guide surface in response to changes in the pressure differential across said filter element.

4. The filter device as defined in claim 3 and including indicator means carried exteriorly of said housing structure and operably connected with said pressure responsive member to indicate the position thereof whereby to indicate the clogged condition of said filter element.

5. The filter device as defined in claim 3 and including,
   (a) a passage provided in said housing structure intermediate said inlet end and said outlet,
   (b) a normally closed valve means carried in said passage and operably connected to said pressure responsive means to open a fluid path directly between said inlet end and said outlet upon the pressure differential across said filter element increasing to a predetermined value.

6. The filter device as defined in claim 3 and in which said annular guide surface is formed on an axis substantially coaxial with the axis of said tubular member.

7. The filter device as defined in claim 3 and including
   (a) a first passage provided in said housing structure intermediate the outlet side of said filter element and said outlet,
   (b) a second passage intermediate the inlet side of said filter element and said outlet, and
   (c) normally closed valve means carried in said second passage and said pressure responsive means operably connected to said valve member to open said second passage upon the pressure differential across said filter element increasing to a predetermined value.

8. The device as defined in claim 7 and including indicator means carried exteriorly of said housing structure and operably connected with said valve member to indicate the position thereof whereby to indicate the degree of clogging of said filter element.

9. The filter device as defined in claim 3 and including valve means operably coacting with said pressure responsive means to open a fluid path bypassing said filter element upon the pressure differential across said filter element reaching a predetermined value.

10. The filter device as defined in claim 3 and in which said valve means includes,
    (a) a baffle member fixed to said housing structure,
    (b) said baffle member being provided with a plurality of ports providing communication between the outlet side of said filter element and said outlet,
    (c) a valve member having a portion slidably carried on said baffle member and being operable to move to a position directing fluid from the inlet side of said filter element through said ports and to said outlet upon the pressure differential across said filter element increasing to a predetermined value.

References Cited by the Examiner

UNITED STATES PATENTS

| | | | |
|---|---|---|---|
| 2,057,779 | 10/1936 | Jacobs | 210—172 |
| 2,170,074 | 8/1939 | Hewitt | 210—44 |
| 2,439,936 | 4/1948 | Kosten | 210—130 |
| 2,983,384 | 5/1961 | Winslow | 210—310 |
| 2,994,403 | 8/1961 | Winslow | 210—304 |
| 3,080,058 | 3/1963 | Rosaen | 210—96 |

REUBEN FRIEDMAN, *Primary Examiner.*

S. ZAHARNA, *Assistant Examiner.*